United States Patent [19]
Briley et al.

[11] 3,721,097
[45] March 20, 1973

[54] AMMONIA EFFLUENT RECOVERY AND LIQUEFACTION FROM TEXTILE TREATING ZONE

[75] Inventors: George C. Briley; James J. Shepherd; Thomas A. Lyons, all of Houston, Tex.

[73] Assignee: Cluett Peabody & Co., Inc., New York, N.Y.

[22] Filed: Nov. 16, 1970

[21] Appl. No.: 89,927

[52] U.S. Cl. ...................62/11, 62/113, 62/184, 62/503, 62/510, 134/12
[51] Int. Cl. ...................F25j 1/00, F25j 3/00
[58] Field of Search........62/503, 506, 510, 474, 475, 62/196, 184, 113, 11, 17, 20, 23; 134/10–12; 23/198, 199; 425/358, 359

[56] References Cited

UNITED STATES PATENTS

| | | | |
|---|---|---|---|
| 2,453,033 | 11/1948 | Patterson | 62/510 |
| 1,690,585 | 11/1928 | Kniskern | 62/510 |
| 2,075,510 | 3/1937 | Davis | 23/199 |
| 1,760,013 | 5/1930 | Snyder | 23/199 |
| 1,951,819 | 3/1934 | Christin | 23/199 |
| 1,957,849 | 5/1934 | Pyzel | 23/199 |
| 3,409,397 | 11/1968 | Fayon | 23/199 |
| 3,368,869 | 2/1968 | Gaumer | 23/199 |

Primary Examiner—Norman Yudkoff
Assistant Examiner—A. F. Purcell
Attorney—Leo Fornero, Robert J. Dockery and Robert J. Seligman

[57] ABSTRACT

Ammonia is recovered and liquefied from a mixture of ammonia and air emitted from an ammonia treatment chamber used in processing of textiles. The processing of textiles is regarded herein as the "prime" system. In the recovery system, subordinated to the prime system, cooling and compression are followed by condensing then purging. Noncondensibles are oxidized in an furnace and liquid ammonia is returned for reuse to the treatment chamber of the prime system. Controlling delivery of the mixture from the treatment chamber based on pressure therein accommodates maintainance of a minimal negative pressure in the treatment chamber. The furnace is used also to dispose of the ammonia and air mixture during startup and shutdown of the prime system. The furnace also may be used to oxidize ammonia from the treatment chamber so that the treatment chamber can function in its normal manner even in the event the recovery system is out of service. When feed to the recovery system is interrupted, a recycled stream is brought into play to load falsely the compressor so that shutdown thereof is avoided.

4 Claims, 3 Drawing Figures

AMMONIA EFFLUENT RECOVERY AND LIQUEFACTION FROM TEXTILE TREATING ZONE

BACKGROUND OF THE INVENTION

In recent years, with such developments as permanent-press garments and demanding industrial requirements for textiles formed into specific shapes, there has been increased emphasis on treatment of fabrics with liquid ammonia. Large quantities of ammonia find their way into such processes, so there is a consequent involvement in disposing of or reclaiming ammonia effluent from ammonia treatment chambers. Unfortunately, recovery of ammonia from treatment chambers has been frustrated. Some difficulties encountered in ammonia recovery have been explosion hazards, unreliability, interference with (and worse, disruption of) the prime system of processing textiles. Last, but certainly not least, expense has been prohibitive. Textile mills have been able to find more profitable ways to invest their capital than in ammonia recovery systems. A clear and present need has arisen for ammonia recovery from effluents of ammonia treatment chambers; within operational and economic parameters with which the textile industry can cope.

INVENTION

The present invention addresses ammonia recovery and liquefaction of effluent from ammonia treatment chambers of prime textile processing systems in a novel and facile manner. Basically cooling and compressing are followed by condensing, purging and oxidizing of noncombustibles. Further, an inexpensive, safe and reliable recovery system is here made subservient to the prime textile processing system. Delivery to the recovery system of a mixture of ammonia and air from the ammonia treatment chamber is used to control pressure in the treatment chamber so that a minimal negative pressure required therein is maintained. A furnace is employed to oxidize ammonia from the chamber during periods when the prime system is being charged with or discharged of ammonia. The furnace also stands by for oxidizing the mixture in the event the recovery system is nonoperational. Shutdown of the compressor is avoided by a recycle arrangement. Accordingly, this invention fulfills the need of the textile industry for an ammonia recovery and liquefaction system of the character stated.

One object of the invention is to provide a system of the character stated which enables maintainance of a reliable minimal negative pressure on the ammonia treatment chamber, so that ammonia outleakage therefrom is minimized.

Another object of the invention is to provide a system of the character stated which recovers and liquefies ammonia effluent from the ammonia treatment chamber at lower cost and with greater efficiency then by prior-art systems.

Another object of the invention is to provide a system of the character stated which permits operation of the treatment chamber, even if compressive failure should occur.

Another object of the invention is to provide a system of the character stated which permits rapid startup and convenient shutdown of the prime system.

Another object of the invention is to provide a system of the character stated wherein the compressor can be run without damage even in the event of loss of load from the treatment chamber.

Another object of the invention is to provide a system of the character stated which is substantially self purgeable.

Another object of the invention is to provide a system of the character stated which can be used to unload portable tanks of ammonia.

Another object of the invention is to provide a system of the character stated which can accommodate a wide variety of compressors; reciprocable or centrifugal, with or without oil lubrication, single or multi stage, etc. Also, other types of refrigeration systems such as an absorption system can be employed.

Another object of the invention is to provide a system of the character stated which is simple to operate, rugged, adaptable to a wide variety of ambient conditions and well suited otherwise to its intended function.

DRAWINGS

The foregoing and other features will be seen more fully from a detailed description of a preferred embodiment of the invention viewed in conjunction with the accompanying drawings wherein.

DESCRIPTION OF THE PREFERRED EMBODIMENT

Figure 1:
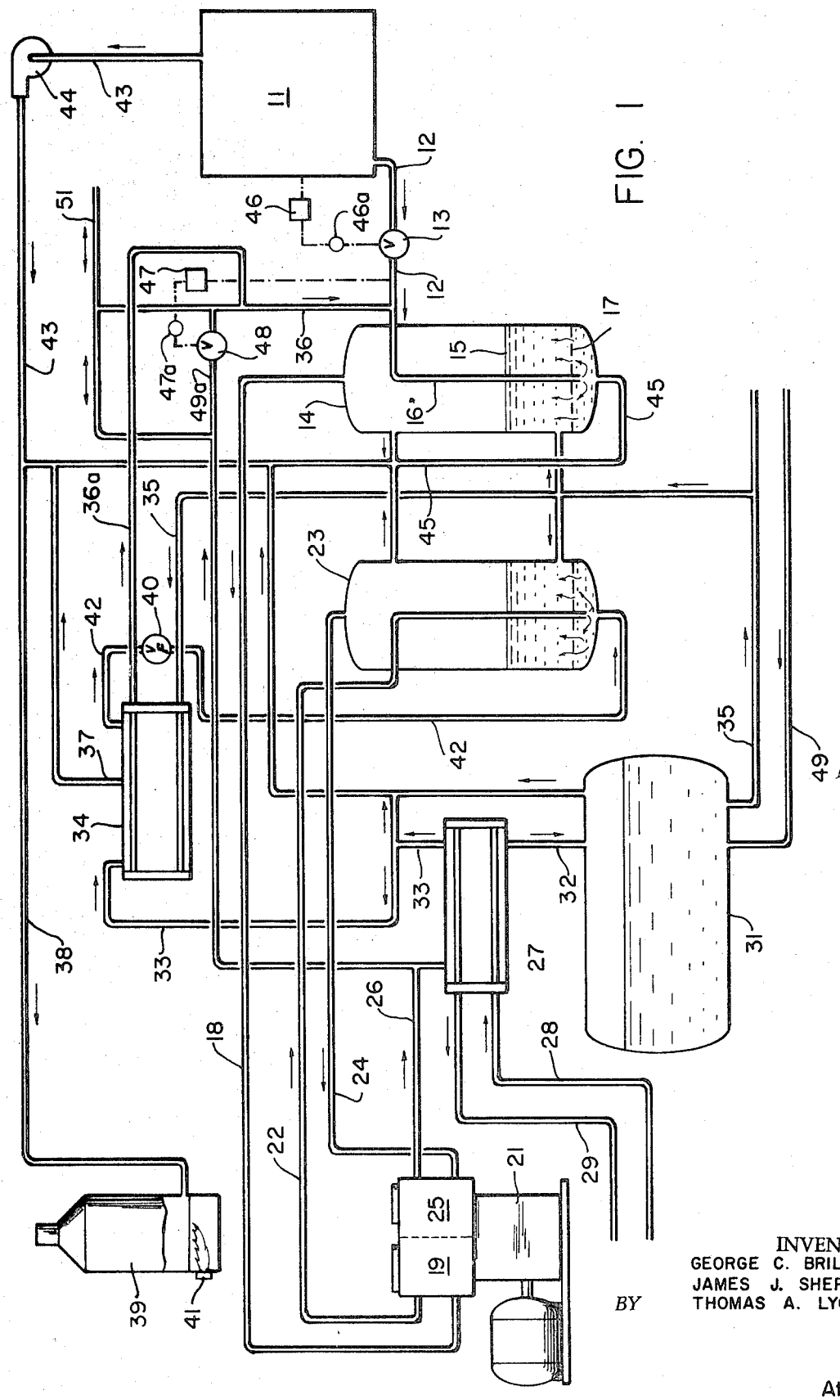
FIG. 1 is a flow diagram depicting an ammonia recovery and liquefaction system according to the present invention.

As can be seen from FIG. 1, the basic ammonia recovery and liquefaction system of the present invention is designed to remove gaseous ammonia (along with air) from treatment chamber 11 of a prime textile processing system via suction line 12 for ammonia recovery therefrom and liquefaction of the recovered ammonia. Treatment chamber 11 may be one of several types of installations which treat textiles with liquid ammonia. Treatment chamber 11, which does not form part of this invention, is held at a minimal negative pressure so that outleakage of ammonia therefrom is kept to a minimum. The desired pressure in treatment chamber 11 is maintained by valve 13 and a differential pressure transmitter 46, which is sensed by pressure in treatment chamber 11, and pressure controller 46a to operate valve 13.

The mixture of ammonia and air from treatment chamber 11 is relatively hot and is drawn via line 12 through regulating valve 13 by virtue of a pressure differential to desuperheater 14 wherein the stream is bubbled upward through liquid ammonia 15 by means of downcomer 16 and orifice plate 17 for cooling. From desuperheater 14 the mixture is introduced via line 18 to first stage 19 of compressor 21 wherein it is pressurized typically from atmospheric pressure to about 45 psia. The mixture is then conducted by means of line 22 to intercooler 23 wherein it is again cooled by being bubbled upward through liquid ammonia as in desuperheater 14. The mixture is then introduced via line 24 to second stage of compressor 21 wherein it is pressurized typically to about 180 psia. The mixture is then conducted via line 26 to the shell side of shell-and-tube condenser 27 wherein it is passed in noncontact heat-exchange relationship with water on the tube side thereof. Water is delivered to the tube side of condenser 27 via line 28 from a source not shown and is removed via line 29. Condensed ammonia is withdrawn from condenser 27 to storage tank 31 via line 32. A suitable check valve (not shown) would normally be provided in line 32. Uncondensed ammonia-lean gases exit condenser 27 via line 33 for passage to the shell side of shell-and-tube purger 34 wherein these ammonia-lean gases pass in noncontact heat-exchange relationship with liquid ammonia. The liquid ammonia for purger 34 is delivered from storage tank 31 to the tube side of purger 34 via line 35 and exits via lines 36a and 36 for circulation to desuperheater 14. Uncondensibles from the shell side of purger 34 exit via lines 37 and 38 to furnace 39 which is provided with a suitable burner 41 to completely oxidize any ammonia remaining in the uncondensibles so as to produce a clean, safe, gaseous effluent. Furnace 39 is provided also with a blower, a source of fuel, a flame-failure system and suitable combustion-control equipment all of which are well known. Liquid ammonia exits the shell side of purger 34 by way of line 42 (provided with float valve 40) for circulation to intercooler 23.

It is an important aspect of this invention to have the ammonia recovery and liquefaction system subservient to the prime system of processing textiles. To operate the ammonia recovery and liquefaction system, ammonia concentration in treatment chamber 11 must be above its explosive level. Line 43 with blower 44 communicates treatment chamber 11 with furnace 39 via line 38 so that ammonia can be withdrawn from treatment chamber 11 and oxidized. In this regard it should be noted that furnace 39 is available to purge various items of equipment in the system such as desuperheater 14 via lines 45 and 38.

Operation of treatment chamber 11 must be independent of the ammonia recovery and liquefaction system of this invention. In the event of shutdown of this ammonia recovery and liquefaction system, for example due to compressor trouble, blower 44 can deliver the mixture of ammonia and air to furnace 39 via line 38 for oxidation whereby treatment chamber 11 can continue to function without interruption.

This ammonia recovery and liquefaction system also avoids low-flow shutdown of compressor 21 on interruption of the mixture of ammonia and air from treatment chamber 11. Differential pressure transmitter 46 along with pressure controller 46a operate valve 13 to control pressure in treatment chamber 11 so that a minimal negative pressure in the order of a fraction of an inch of water vacuum is maintained therein. Because of this minimal negative pressure, outleakage of ammonia from treatment chamber 11 is minimized. In the event of interruption of flow from treatment chamber 11, differential pressure transmitter 47 along with pressure controller 47a opens valve 48 to recycle gas via lines 49a, 36 and 16 to impose a false load on the compressor. When the system is operating normally, valve 48 is closed.

Line 49 accommodates delivery of liquid ammonia to storage tank 31. Line 51 can be used for withdrawing ammonia vapors from tank cars, also using line 36 and 12.

Figure 2:
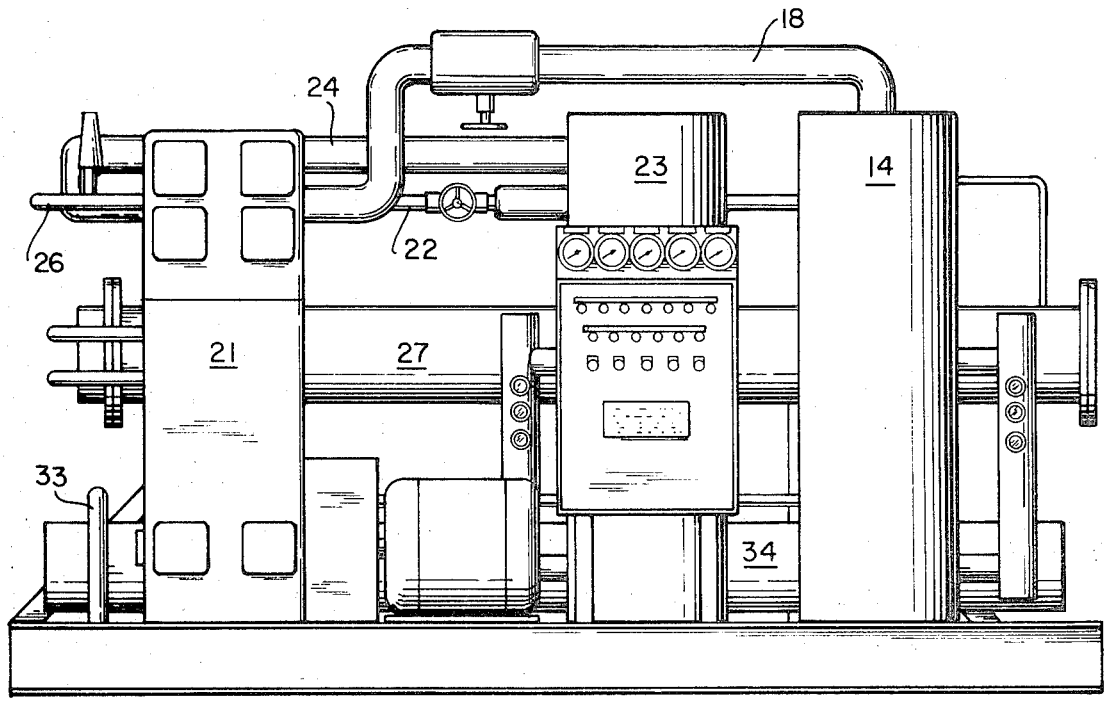
FIG. 2 is a front elevation view of an ammonia recovery and liquefaction system according to the present invention and mounted on skids.
Figure 3:
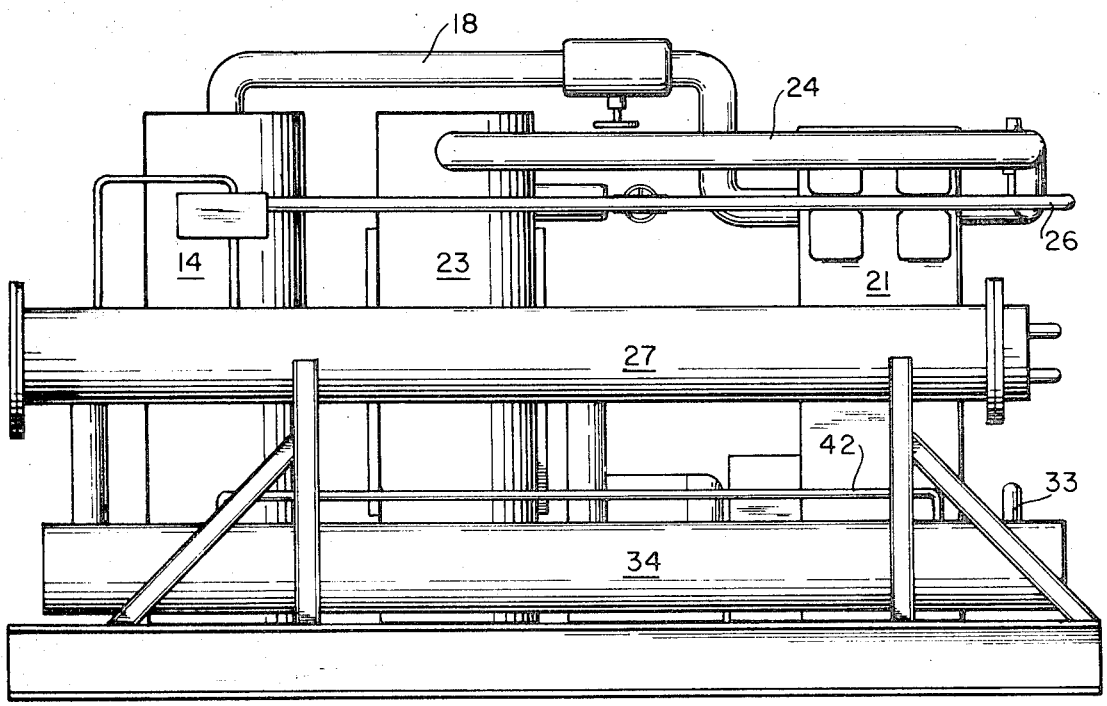
FIG. 3 is a rear elevation view of the system of FIG. 2.

As seen in FIGS. 2 and 3, the essential items of this ammonia recovery and liquefaction system are skid mounted for convenient shipment. These essential items include controls, desuperheater 14, compressor 21, intercooler 23, condenser 27 and purger 34. The furnace is mounted in its own module. Other items such as condenser water hookups, electrical hookups, jacket water hookups for the compressor, ammonia storage and the like are installed in the field.

It will be apparent to those skilled in refrigeration that wide deviations may be made from the shown preferred embodiment without departing from the main theme of invention set forth in the following claims. By way of example, unloading may be provided for the second stage of compression to avoid excessive buildup of pressure in condenser 27.

We claim:

1. A subservient process for recovering and liquefying ammonia discharged as waste from a master process without interfering with operation of the master process, with the ammonia discharged from the master process in a mixture which includes ammonia as well as air, the mixture having as its source a chamber of the master process wherein textiles are treated with liquid ammonia and which chamber is maintained at a minimal negative pressure; the process comprising steps of:
    sensing the pressure in the chamber;
    regulating delivery of the mixture from the chamber responsive to the pressure in the chamber;
    cooling and compressing the mixture as follows:
        desuperheating the mixture by bubbling it upward through liquid ammonia, then
        subjecting the mixture to a first stage of compression, then
        cooling the mixture by bubbling it upward through liquid ammonia in an intercooler,
        then subjecting the mixture to a second stage of compression;
    delivering the mixture into a condenser in noncontact heat-exchange relationship with water to separate liquid ammonia from the mixture leaving an ammonia-lean gas;
    withdrawing the liquid ammonia from the condenser,
    delivering the ammonia-lean gas from the condenser into a purger in noncontact heat-exchange relationship with liquid ammonia from the ammonia-lean gas leaving noncondensibles,
    withdrawing the additional liquid ammonia from the purger;
    withdrawing the noncondensibles from the purger;
    burning the noncondensibles withdrawn from the purger;
    providing for burning of the mixture as an alternative to the foregoing whereby the master process can operate even if the subservient process becomes inoperable and whereby the mixture can be burned if its ammonia content is low enough to present an explosion hazard.

2. The process of claim 1 and
    controlling the compression by the delivery of the mixture from the chamber for desuperheating;

sensing interruption of delivery of the mixture from the chamber;

on said interruption recycling the mixture for desuperheating to sustain the compressing.

3. A subservient system for recovering and liquefying ammonia discharged as waste from a master system without interfering with the master system, with the ammonia discharged from the master system in a mixture which includes ammonia as well as air, the mixture having as its source a chamber wherein textiles are treated with liquid ammonia and which chamber is maintained at a minimal negative pressure; the system comprising in combination:

sensor means for sensing the pressure in the chamber;

regulator means for regulating delivery of the mixture from the chamber responsive to the pressure in the chamber;

compressor means for compressing and cooler means for cooling the mixture, said means comprising collectively:

a desuperheater connected to receive the mixture from the chamber and to bubble it upward through liquid ammonia, a compressor having a first stage which is connected to receive the mixture from the desuperheater and arranged for pressurizing the mixture, an intercooler connected to receive the mixture from the first stage and to bubble it upward through liquid ammonia, the compressor having a second stage which is connected to receive the mixture from the intercooler and arranged for further pressurizing the mixture;

a condenser connected to receive the mixture from the compressor and cooler means and passing the mixture in noncontact heat-exchange relationship with water to separate liquid ammonia from the mixture leaving an ammonia-lean gas;

means for withdrawing the liquid ammonia from the condenser;

a purger connected to receive the ammonia-lean gas from the condenser and passing it in noncontact heat-exchange relationship with liquid ammonia to separate additional liquid ammonia from the ammonia-lean gas leaving noncondensibles;

means for withdrawing the additional liquid from the purger;

means for withdrawing the noncondensibles from the purger;

furnace means for burning the noncondensibles withdrawn from the purger;

means operatively connecting the chamber to the furnace means for burning the mixture as an alternative to the foregoing whereby the master system can operate even if the subservient system becomes inoperable and whereby the mixture can be burned if its ammonia content is low enough to present an explosion hazard.

4. The system of claim 3 and control means for controlling the compressor operation responsive to delivery of the mixture to the desuperheater;

interruption sensor means for sensing interruption of delivery of the mixture to the desuperheater;

recycle means responsive to the interruption sensor means for recycling the mixture from the compressor to the desuperheater to sustain the compressor operation.

* * * * *